United States Patent
Sakai et al.

(10) Patent No.: US 10,240,674 B2
(45) Date of Patent: Mar. 26, 2019

(54) SEALING DEVICE

(71) Applicants: Koyo Sealing Techno Co., Ltd., Tokushima (JP); JTEKT Corporation, Osaka (JP)

(72) Inventors: Shintaro Sakai, Tokushima (JP); Katsuyuki Sakaji, Tokushima (JP); Yoshito Takada, Osaka (JP)

(73) Assignees: Koyo Sealing Techno Co., Ltd., Tokushima (JP); JTEKT Corporation, Osaka (JP)

( * ) Notice: Subject to any disclaimer, the term of this patent is extended or adjusted under 35 U.S.C. 154(b) by 48 days.

(21) Appl. No.: 14/935,037

(22) Filed: Nov. 6, 2015

(65) Prior Publication Data

US 2016/0131257 A1    May 12, 2016

(30) Foreign Application Priority Data

Nov. 7, 2014  (JP) .................. 2014-227271

(51) Int. Cl.
*F16C 19/38* (2006.01)
*F16C 33/78* (2006.01)
(Continued)

(52) U.S. Cl.
CPC ......... *F16J 15/002* (2013.01); *B60B 27/0073* (2013.01); *F16C 19/386* (2013.01);
(Continued)

(58) Field of Classification Search
CPC .............. F16C 33/7863; F16C 33/7876; F16C 33/7883; F16C 33/7886; F16C 33/805;
(Continued)

(56) References Cited

U.S. PATENT DOCUMENTS 7,674,044 B2 * 3/2010 Matsui ................ F16C 33/7876
384/480
8,047,721 B2 * 11/2011 Aritake ................ F16C 19/386
384/477
(Continued)

FOREIGN PATENT DOCUMENTS

JP    2006-010055 A    1/2006
JP    2010-236568 A    10/2010
(Continued)

OTHER PUBLICATIONS

Office Action issued in corresponding Japanese Application No. 2014-227271 dated May 22, 2018 (3 pages).

*Primary Examiner* — Nicholas L Foster
(74) *Attorney, Agent, or Firm* — Osha Liang LLP

(57) ABSTRACT

A sealing device which allows the man-hour for mounting the sealing device to be reduced is provided. A sealing device includes: a slinger fitted and fixed to an end portion of an inner shaft; a core metal fitted and fixed to an end portion of an outer ring; an inner seal lip fixed to the core metal and in slidable contact with the slinger; an outer seal lip fixed to the core metal radially outward of the inner seal lip and in slidable contact with a side surface of a flange portion; and a labyrinth lip fixed to the core metal radially outward of the outer seal lip and forming a labyrinth seal together with the side surface of the flange portion.

3 Claims, 4 Drawing Sheets

(51) Int. Cl.
*F16C 33/80* (2006.01)
*F16J 15/00* (2006.01)
*F16J 15/40* (2006.01)
*F16J 15/447* (2006.01)
*F16J 15/3232* (2016.01)
*F16J 15/3264* (2016.01)
*B60B 27/00* (2006.01)

(52) U.S. Cl.
CPC ........ *F16C 33/7883* (2013.01); *F16C 33/805* (2013.01); *F16J 15/3232* (2013.01); *F16J 15/3264* (2013.01); *F16J 15/40* (2013.01); *F16J 15/447* (2013.01); *B60B 27/00* (2013.01); *F16C 33/7813* (2013.01); *F16C 2326/02* (2013.01)

(58) Field of Classification Search
CPC .... F16J 15/002; F16J 15/3232; F16J 15/3256; F16J 15/3264; F16J 15/447; F16J 15/4472
See application file for complete search history.

(56) References Cited

U.S. PATENT DOCUMENTS

| | | | | |
|---|---|---|---|---|
| 8,702,314 | B2* | 4/2014 | Takimoto | F16C 33/783 277/353 |
| 8,794,842 | B2* | 8/2014 | Komori | F16C 35/067 384/485 |
| 8,905,641 | B2* | 12/2014 | Duch | B60B 27/0073 384/480 |
| 9,090,122 | B2* | 7/2015 | Morita | F16C 33/805 |
| 9,475,343 | B2* | 10/2016 | Wakisaka | B60B 27/0073 |
| 9,511,627 | B2* | 12/2016 | Morello | B60B 27/0005 |
| 9,534,635 | B2* | 1/2017 | Norimatsu | B60B 27/00 |
| 2007/0076994 | A1* | 4/2007 | Norimatsu | B60B 27/00 384/486 |
| 2007/0147718 | A1* | 6/2007 | Takimoto | F16C 33/7886 384/486 |
| 2007/0278748 | A1* | 12/2007 | Matsui | F16C 33/7869 277/549 |
| 2008/0292231 | A1* | 11/2008 | Matsui | F16C 33/7876 384/486 |
| 2009/0257698 | A1* | 10/2009 | Aritake | F16C 19/386 384/484 |
| 2009/0263063 | A1* | 10/2009 | Komori | F16C 35/067 384/478 |
| 2010/0247014 | A1* | 9/2010 | Ohmori | F16C 19/186 384/486 |
| 2011/0304197 | A1* | 12/2011 | Norimatsu | B60B 27/00 301/110 |
| 2012/0007316 | A1* | 1/2012 | Terasawa | F16C 33/7876 277/361 |
| 2013/0127119 | A1* | 5/2013 | Haepp | F16C 33/7863 277/351 |
| 2013/0241270 | A1* | 9/2013 | Morita | F16C 33/805 301/110 |
| 2013/0243360 | A1* | 9/2013 | Takimoto | F16C 33/783 384/486 |
| 2014/0037239 | A1* | 2/2014 | Duch | B60B 27/0073 384/480 |
| 2015/0110432 | A1* | 4/2015 | Wakisaka | B60B 27/0073 384/486 |
| 2015/0316151 | A1* | 11/2015 | Suzuki | F16J 15/3256 277/562 |
| 2016/0003302 | A1* | 1/2016 | Seno | F16J 15/3264 277/351 |
| 2016/0114624 | A1* | 4/2016 | Morello | B60B 27/0005 384/480 |

FOREIGN PATENT DOCUMENTS

| | | |
|---|---|---|
| JP | 5179841 B2 | 4/2013 |
| JP | 2013-200039 A | 10/2013 |
| JP | 2014-013063 A | 1/2014 |
| JP | 2014-101897 A | 6/2014 |

* cited by examiner

PRIOR ART

SEALING DEVICE

TECHNICAL FIELD

The present invention relates to a sealing device used in, for example, a rolling bearing apparatus for supporting a wheel of an automobile.

BACKGROUND ART

Hitherto, in a rolling bearing apparatus for supporting a wheel of an automobile or the like, a sealing device is used for sealing between inner and outer rings to prevent foreign matter such as muddy water from entering the rolling bearing apparatus. Such a sealing device is mounted at each of both ends of a space between the inner and outer rings of the rolling bearing apparatus (e.g., see PATENT LITERATURE 1).

FIG. 4 is a cross-sectional view showing a conventional sealing device mounted at one end side of a rolling bearing apparatus for an automobile. In this drawing, the rolling bearing apparatus 100 includes an inner shaft 101 which is integrally formed with a flange portion 101a for fixing a wheel of the automobile, an inner ring 102 as a rotational ring which is externally fitted and fixed to the inner shaft 101, an outer ring 103 as a fixed ring, and balls 104 as rolling elements.

The sealing device 110 mounted on the rolling bearing apparatus 100 includes: a slinger 111 which is fitted and fixed to the outer peripheral surface of the inner ring 102, extends in a radially outward direction, and is made of a metal; an inner seal member 112 which is mounted at the inner peripheral side of an end portion of the outer ring 103 opposed to the slinger 111; and an outer seal member 113 which is mounted at the outer peripheral side of the end portion of the outer ring 103.

The inner seal member 112 includes a core metal 114 which is internally fitted and fixed to the end portion of the outer ring 103, and a plurality of inner seal lips 115 to 117 which are fixed to the core metal 114 and are in slidable contact with the slinger 111. The plurality of inner seal lips 115 to 117 are formed so as to extend from an inner peripheral end portion of the core metal 114 toward the slinger 111 and are in slidable contact with the slinger 111 which rotates with running of the vehicle, thereby sealing a gap between the inner ring 102 and the outer ring 103 to prevent foreign matter such as muddy water from entering the rolling bearing apparatus 100.

The outer seal member 113 includes a core metal 118 which is externally fitted and fixed to the end portion of the outer ring 103, and an outer seal lip 119 and a labyrinth lip 120 which are fixed to the core metal 118. The outer seal lip 119 is formed so as to extend from an inner peripheral end portion of the core metal 118 toward a side surface of the flange portion 101a and is in slidable contact with the side surface of the flange portion 101a which rotates with running of the vehicle, thereby sealing a gap between the flange portion 101a and the outer ring 103. In addition, the labyrinth lip 120 is formed so as to extend from an outer peripheral end portion of the core metal 118 toward the side surface of the flange portion 101a and forms a labyrinth seal together with the side surface of the flange portion 101a. The outer seal lip 119 and the labyrinth lip 120 prevent foreign matter such as muddy water from entering through the gap between the end portion of the outer ring 103 and the side surface of the flange portion 101a.

CITATION LIST

Patent Literature

PATENT LITERATURE 1: Japanese Patent No. 5179841 (see FIG. 3)

SUMMARY OF INVENTION

Technical Problem

Regarding the sealing device 110, it is necessary to individually mount the slinger 111, the inner seal member 112, and the outer seal member 113 to the rolling bearing apparatus 100. Thus, the sealing device 110 has a problem that the man-hour for mounting the sealing device 110 increases.

The present invention has been made in view of such a problem, and an object of the present invention is to provide a sealing device which allows the man-hour for mounting the sealing device to be reduced.

Solution to Problem

A sealing device according to the present invention is used in a rolling bearing apparatus which includes an inner shaft and an outer ring disposed so as to be concentric with each other and in which a flange portion having a side surface opposed to an end surface of the outer ring with a gap provided therebetween is integrally formed at an end portion of the inner shaft, and seals an annular space between the inner shaft and the outer ring. The sealing device includes: a slinger fitted and fixed to the end portion of the inner shaft and extending in a radially outward direction; a core metal fitted and fixed to an end portion of the outer ring; an inner seal lip fixed to the core metal and in slidable contact with the slinger; an outer seal lip fixed to the core metal radially outward of the inner seal lip and in slidable contact with the side surface of the flange portion; and a labyrinth lip fixed to the core metal radially outward of the outer seal lip, the labyrinth lip forming a labyrinth seal together with the side surface of the flange portion.

According to the present invention, since the outer seal lip which is in slidable contact with the side surface of the flange portion and the labyrinth lip which forms the labyrinth seal together with the side surface of the flange portion are fixed to the core metal to which the inner seal lip which is in slidable contact with the slinger is fixed, it is possible to mount the outer seal lip and the labyrinth lip together with the inner seal lip to the outer ring by fitting and fixing the core metal to the end portion of the outer ring. This can reduce the man-hour for mounting the sealing device.

The slinger preferably includes: a cylindrical portion which is fitted and fixed to the end portion of the inner shaft; and an annular portion which extends in the radially outward direction from an end portion of the cylindrical portion and is disposed so as to be spaced apart from the side surface of the flange portion in an axial direction with a predetermined space provided therebetween.

If the outer seal lip wears out due to long-term use, an annular gap may occur between the outer seal lip and the side surface of the flange portion, and muddy water or the like may enter through the gap. In this case, the muddy water or the like which has entered through the gap temporarily accumulates in a space formed between the annular portion of the slinger and the side surface of the flange portion, and the accumulating muddy water or the like drops due to its weight, whereby it is possible to discharge the muddy water or the like through the gap to the outside. Therefore, even if the outer seal lip wears out, it is possible to suppress entry of muddy water or the like into the rolling bearing apparatus.

Advantageous Effects of Invention

According to the present invention, it is possible to reduce the man-hour for mounting the sealing device.

DETAILED DESCRIPTION OF THE INVENTION

Hereinafter, embodiments of the present invention will be described in detail with reference to the accompanying drawings.

Figure 1:
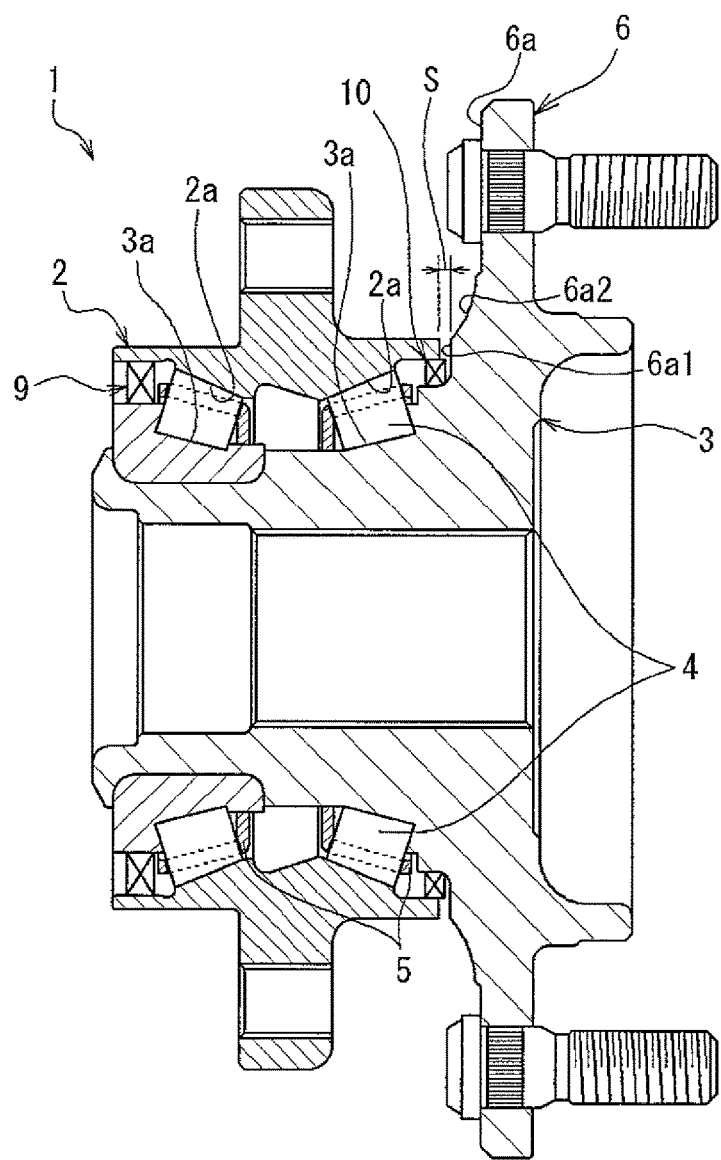
FIG. 1 is a cross-sectional view showing a rolling bearing apparatus in which a sealing device according to a first embodiment of the present invention is used.

FIG. 1 is a cross-sectional view showing a rolling bearing apparatus in which a sealing device according to a first embodiment of the present invention is used. The rolling bearing apparatus 1 supports a wheel of an automobile or the like such that the wheel is rotatable relative to a suspension device.

The rolling bearing apparatus 1 includes an outer ring 2, an inner shaft 3 as an inner ring, a plurality of tapered rollers 4 as rolling elements disposed between the outer ring 2 and the inner shaft 3, and cages 5 which retain the tapered rollers 4, respectively, and forms a double row tapered roller bearing.

The outer ring 2 is a fixed ring which is fixed to the suspension device of the automobile, and is disposed at the outer peripheral side of the inner shaft 3 so as to be concentric with the inner shaft 3. On the inner peripheral surface of the outer ring 2, outer ring raceways 2a on which the tapered rollers 4 roll are formed.

The inner shaft 3 serves as a rotational ring and also forms an axel on which the wheel which is not shown is mounted. On the outer peripheral surface of the inner shaft 3, inner ring raceways 3a on which the tapered rollers 4 roll are formed. A flange portion 6 for fixing the wheel is integrally formed at an end portion of the inner shaft 3. The flange portion 6 has a flange surface (side surface) 6a which includes: a straight portion 6a1 formed so as to extend straight from the end portion of the inner shaft 3 toward the radially outer side; and a curved surface portion 6a2 formed in a concave surface shape so as to extend from the outer peripheral end of the straight portion 6a1 toward the radially outer side. The straight portion 6a1 of the flange surface 6a is opposed to an end surface of the outer ring 2 with a gap S provided therebetween.

The rolling bearing apparatus 1 is fixed to the suspension device such that the end portion side at which the flange portion 6 is formed corresponds to the vehicle outer side (the right side in FIG. 1) and the other end portion side corresponds to the vehicle inner side (the left side in FIG. 1). Thus, the rolling bearing apparatus 1 supports the inner shaft 3 to which the wheel which is not shown is fixed, such that the inner shaft 3 is rotatable relative to the vehicle.

Sealing devices 9 and 10 for sealing an annular space between the outer ring 2 and the inner shaft 3 are mounted between the inner shaft 3 and both axial end portions of the outer ring 2. Of the sealing devices 9 and 10, as the sealing device 10 disposed at the vehicle outer side, a sealing device which is one embodiment of the present invention is used.

Figure 2:
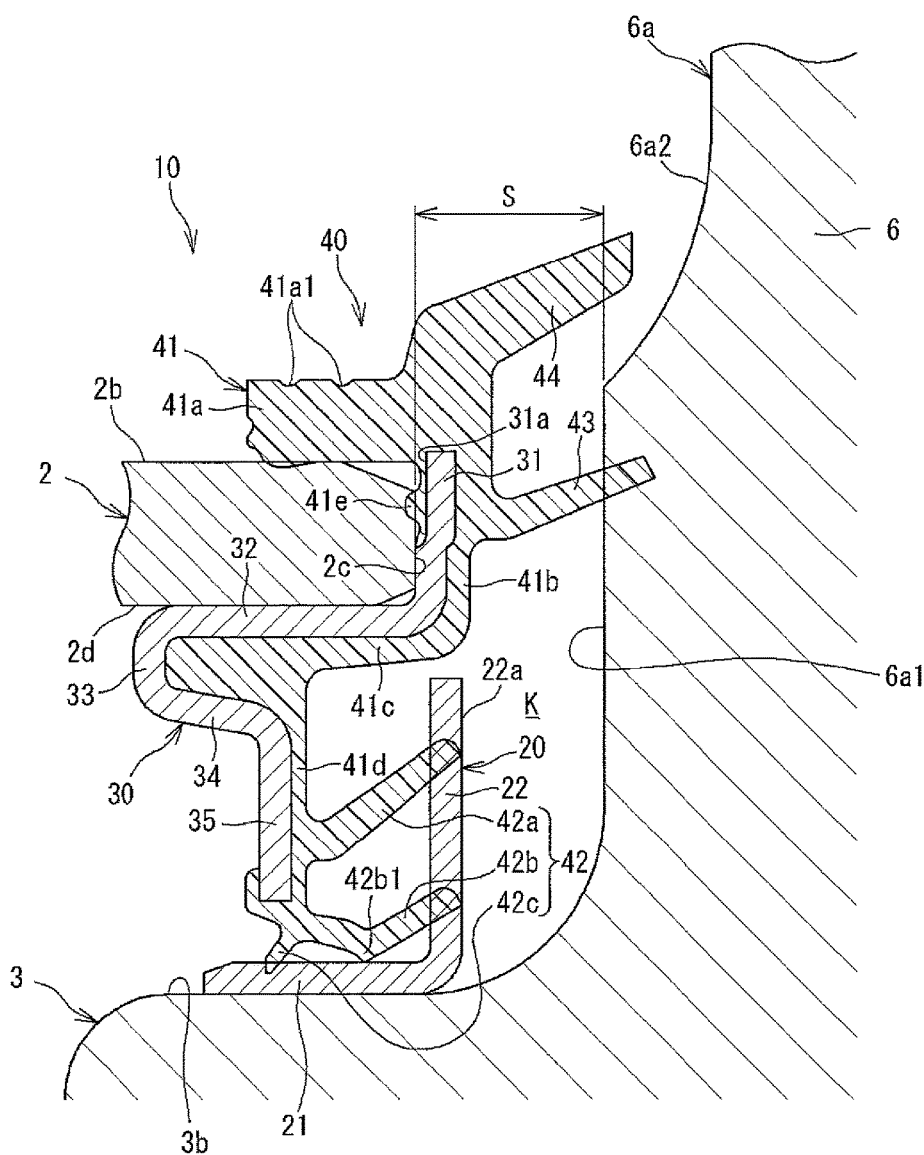
FIG. 2 is an enlarged cross-sectional view showing a main part of the sealing device.

FIG. 2 is an enlarged cross-sectional view of FIG. 1, showing a main part of the sealing device 10. In FIG. 2, the sealing device 10 includes a slinger 20 which is provided at the inner shaft 3 side, and a core metal 30 and a seal member 40 which are provided at the outer ring 2 side. The sealing device 10 shown in FIG. 2 shows a natural state prior to deformation which is a state before the sealing device 10 is mounted to the rolling bearing apparatus 1. In addition, in the present specification, a direction to the vehicle outer side (the rightward direction in FIG. 2) is also referred to an axially outward direction, and a direction to the vehicle inner side (the leftward direction in FIG. 2) is also referred to as an axially inward direction.

The slinger 20 is a member which is made of a metal such as stainless steel (e.g., an SUS material) and has an annular shape as a whole. The slinger 20 includes a cylindrical portion 21 which is fitted and fixed to an outer peripheral surface 3b of an axially outer end portion of the inner shaft 3, and an annular portion 22 which extends in the radially outward direction from an end portion of the cylindrical portion 21. The annular portion 22 is disposed such that a side surface 22a thereof at the axially outer side is spaced apart from the flange surface 6a of the flange portion 6 in the axial direction with an annular space K provided therebetween.

The core metal 30 is a member having an annular shape as a whole, and includes a first annular portion 31, a first cylindrical portion 32, a second annular portion 33, a second cylindrical portion 34, and a third annular portion 35. The first annular portion 31 is disposed along an end surface 2c of the outer ring 2, and an inner peripheral end portion of the first annular portion 31 is in close contact with the end surface 2c of the outer ring 2. An annular recess portion 31a which is recessed in the axially outward direction is formed on the inner peripheral surface of an axially outer end portion of the first annular portion 31.

The first cylindrical portion 32 is fitted and fixed to an inner peripheral surface 2d of the outer ring 2. The second annular portion 33 is formed so as to extend in the radially inward direction from an axially inner end portion of the first cylindrical portion 32. The second cylindrical portion 34 is formed so as to extend in the axially outward direction and the radially inward direction from an inner peripheral end portion of the second annular portion 33. The third annular portion 35 is formed so as to extend in the radially inward direction from an axially outer end portion of the second cylindrical portion 34.

The seal member 40 is formed from an elastic material such as synthetic rubber, and is bonded by vulcanization to the core metal 30. The seal member 40 includes a seal body 41 which is fixed to the core metal 30, and an inner seal lip 42, an outer seal lip 43, and a labyrinth lip 44 which are formed so as to be integrated with the seal body 41. The outer seal lip 43 is disposed radially outward of the inner seal lip 42, and the labyrinth lip 44 is disposed radially outward of the outer seal lip 43.

The seal body 41 is a member having an annular shape as a whole, and includes a first seal cylindrical portion 41a, a first seal annular portion 41b, a second seal cylindrical portion 41c, and a second seal annular portion 41d. The first seal cylindrical portion 41a is formed so as to extend in the axial direction along an outer peripheral surface 2b of the outer ring 2, and an axially inner end portion of the inner peripheral surface of the first seal cylindrical portion 41a is in close contact with the outer peripheral surface 2b of the outer ring 2. A pair of annular grooves 41a1 are formed on the outer peripheral surface of the first seal cylindrical portion 41a so as to be spaced apart from each other in the axial direction with a predetermined interval provided therebetween. The annular grooves 41a1 have a function of guiding muddy water or the like attached to the outer peripheral surface of the first seal cylindrical portion 41a, downward along the annular grooves 41a1 to drop the muddy water or the like.

The first seal annular portion 41b is formed so as to extend in the radially inward direction from an axially outer end portion of the first seal cylindrical portion 41a, and is fixed along the outer surface of the first annular portion 31 of the core metal 30. An annular seal projection 41e is fixed to the recess portion 31a of the first annular portion 31 of the core metal 30 so as to be in close contact with the end surface 2c of the outer ring 2. The seal projection 41e forms a part of the seal body 41.

The second seal cylindrical portion 41c is formed so as to extend in the axially inward direction from an inner peripheral end portion of the first seal annular portion 41b, and an axially inner end portion of the second seal cylindrical portion 41c is fixed to the inner peripheral surface of the first cylindrical portion 32 of the core metal 30, the outer surface of the second annular portion 33, and the outer peripheral surface of the second cylindrical portion 34. An axially outer end portion of the inner peripheral surface of the second seal cylindrical portion 41c forms a labyrinth seal together with the outer peripheral end surface of the annular portion 22 of the slinger 20.

The second seal annular portion 41d is formed so as to extend in the radially inward direction from an axially intermediate portion of the second seal cylindrical portion 41c, and is fixed along the outer surface of the third annular portion 35 of the core metal 30. An inner peripheral end portion of the second seal annular portion 41d is formed so as to turn around from the inner peripheral end of the third annular portion 35 of the core metal 30 to the inner surface side.

The inner seal lip 42 is formed so as to be integrated with the second seal annular portion 41d, and includes annular first and second side lips 42a and 42b and an annular single radial lip 42c.

The first and second side lips 42a and 42b are formed so as to extend in the axially outward direction and the radially outward direction from the outer peripheral surface of the second seal annular portion 41d, and the distal end portions of the first and second side lips 42a and 42b are in slidable contact with the annular portion 22 of the slinger 20. The side lips 42a and 42b have a function of preventing foreign matter such as muddy water from entering the rolling bearing apparatus 1.

A radial slidable contact portion 42b1 is formed in an axially center portion at the inner peripheral side of the second side lip 42b so as to be in slidable contact with the cylindrical portion 21 of the slinger 20.

The radial lip 42c is formed so as to extend in the axially inward direction and the radially inward direction from the inner peripheral end of the second seal annular portion 41d, and the distal end portion of the radial lip 42c is in slidable contact with the cylindrical portion 21 of the slinger 20.

The radial slidable contact portion 42b1 and the radial lip 42c have a function of preventing a lubricant such as grease sealed in the annular space between the outer ring 2 and the inner shaft 3, from leaking to the outside.

The outer seal lip 43 is an annular member and is formed so as to extend in the axially outward direction and the radially outward direction from the axially outer end portion of the first seal cylindrical portion 41a. The distal end portion of the outer seal lip 43 is in slidable contact with the straight portion 6a1 of the flange surface 6a. Thus, the outer seal lip 43 has a function of preventing foreign matter such as muddy water from entering the rolling bearing apparatus 1 through the gap S between the end surface 2c of the outer ring 2 and the straight portion 6a1 of the flange surface 6a.

The labyrinth lip 44 is an annular member and is formed so as to extend in the axially outward direction and the radially outward direction from the outer peripheral surface of the first seal cylindrical portion 41a. The distal end portion of the labyrinth lip 44 is, disposed so as to be spaced apart from the curved surface portion 6a2 of the flange surface 6a with a predetermined minute gap provided therebetween. Thus, the labyrinth lip 44 forms a labyrinth seal together with the curved surface portion 6a2 of the flange surface 6a, and has a function of suppressing entry of foreign matter such as muddy water into the rolling bearing apparatus 1 through the gap S.

As described above, in the sealing device 10 of the present embodiment, the outer seal lip 43 which is in slidable contact with the flange surface 6a of the flange portion 6 and the labyrinth lip 44 which forms the labyrinth seal together with the flange surface 6a are fixed to the core metal 30 to which the inner seal lip 42 which is in slidable contact with the slinger 20 is fixed. Thus, by fitting and fixing the core metal 30 to the end portion of the outer ring 2, it is possible to mount the outer seal lip 43 and the labyrinth lip 44 together with the inner seal lip 42 to the outer ring 2. This can reduce the man-hour for mounting the sealing device 10.

In the sealing device 10 of the present embodiment, if the outer seal lip 43 wears out due to long-term use, an annular gap may occur between the outer seal lip 43 and the flange surface 6a of the flange portion 6, and muddy water or the like may enter through the gap. In this case, the muddy water or the like which has entered through the gap temporarily accumulates in the space K formed between the annular portion 22 of the slinger 20 and the flange surface 6a, and the accumulating muddy water or the like drops due to its weight, whereby it is possible to discharge the muddy water or the like through the gap to the outside. Therefore, even if the outer seal lip 43 wears out, it is possible to suppress entry of muddy water or the like into the rolling bearing apparatus 1.

Figure 3:
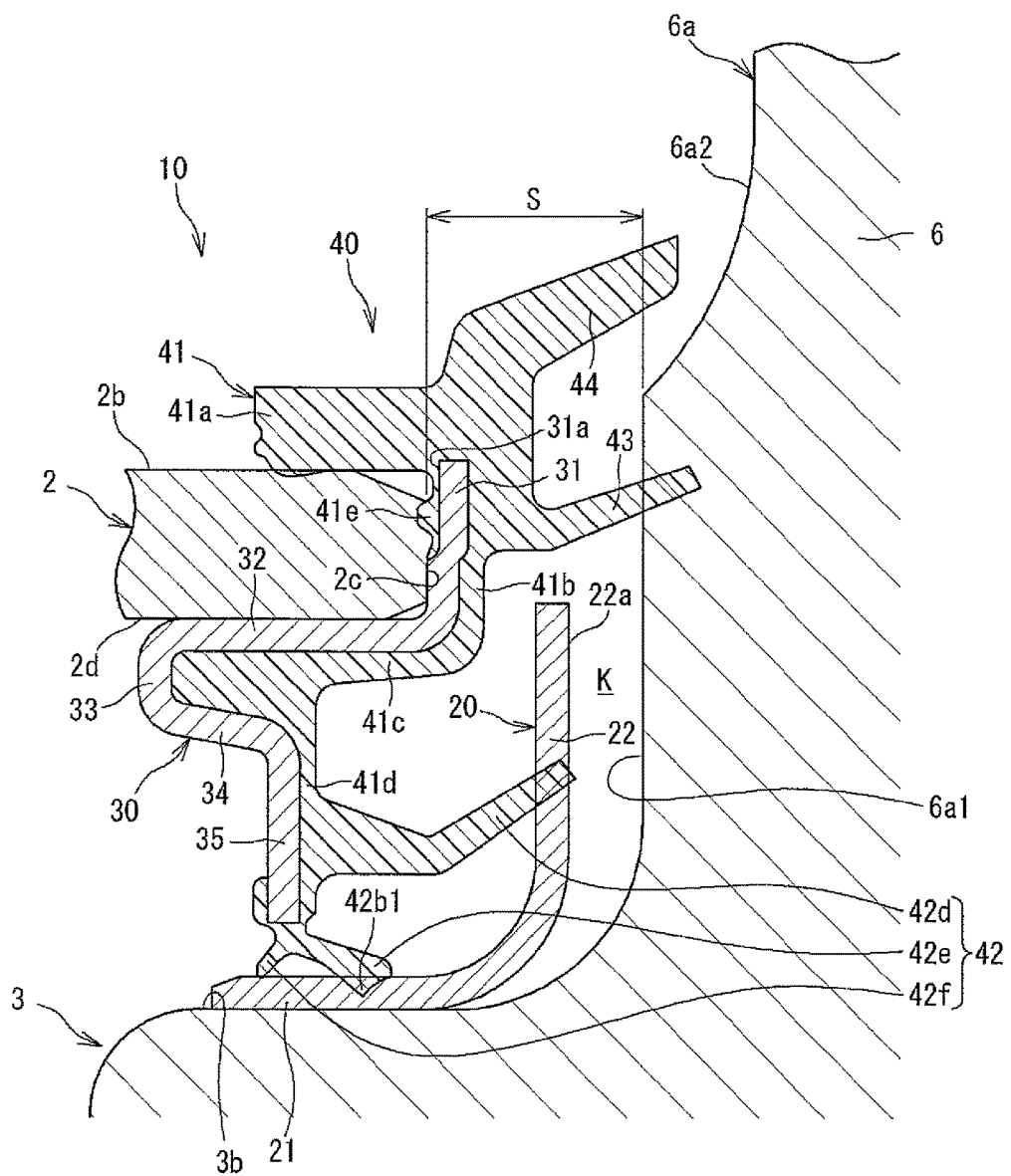
FIG. 3 is an enlarged cross-sectional view showing a main part of a sealing device according to a second embodiment of the present invention.
Figure 4:
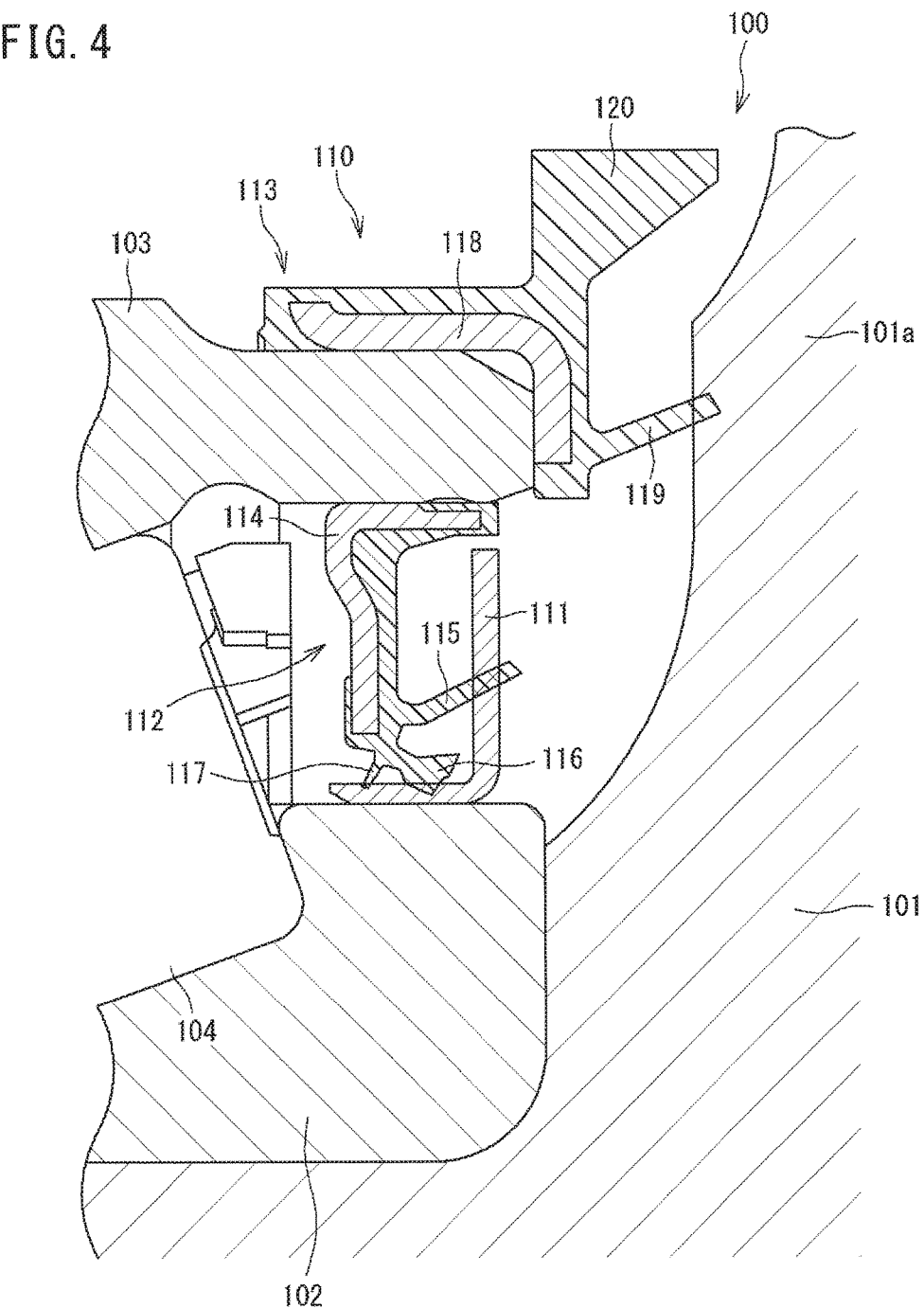
FIG. 4 is a cross-sectional view showing a conventional sealing device.

FIG. 3 is an enlarged cross-sectional view showing a sealing device according to a second embodiment of the present invention. The sealing device 10 of the present embodiment is different from the sealing device 10 of the first embodiment mainly in that the shape of the inner seal lip 42 is different. The inner seal lip 42 of the present embodiment includes an annular single side lip 42d and annular first and second radial lips 42e and 42f. The second radial lip 42f is disposed axially inward of the first radial lip 42e.

The side lip 42d is formed so as to extend in the axially outward direction and the radially outward direction from the outer peripheral surface of the second seal annular portion 41d, and the distal end portion of the side lip 42d is in slidable contact with the annular portion 22 of the slinger 20. Thus, the side lip 42d has a function of preventing foreign matter such as muddy water from entering the rolling bearing apparatus 1.

The first radial lip 42e is formed so as to extend in the axially outward direction and the radially inward direction from the inner peripheral end of the second seal annular portion 41d, and the distal end portion of the first radial lip 42e is in slidable contact with the cylindrical portion 21 of the slinger 20. The second radial lip 42f is formed so as to extend in the axially inward direction and the radially inward direction from the inner peripheral end of the second seal annular portion 41d, and the distal end portion of the second radial lip 42f is in slidable contact with the cylindrical portion 21 of the slinger 20. The first and second radial lips 42e and 42f have a function of preventing a lubricant sealed in the annular space between the outer ring 2 and the inner shaft 3, from leaking to the outside.

It should be noted that the points whose description is omitted in the second embodiment are the same as in the first embodiment.

It should be noted that the present invention is not limited to the above-described embodiments and may be implemented by appropriately changing the embodiments. For example, the inner seal lip 42, the outer seal lip 43, and the labyrinth lip 44 in each embodiment described above are fixed to the core metal 30 via the seal body 41, but may be fixed directly to the core metal 30.

REFERENCE SIGNS LIST 1 rolling bearing apparatus
2 outer ring
3 inner shaft
6 flange portion
6a flange surface (side surface)
10 sealing device
20 slinger
21 cylindrical portion
22 annular portion
30 core metal
42 inner seal lip
43 outer seal lip
44 labyrinth lip
K space
S gap

The invention claimed is:

1. A sealing device that seals an annular space formed between an inner shaft and an outer ring of a roller bearing apparatus that are concentric with each other, wherein the roller bearing apparatus includes a flange portion that is integrally formed at an end portion of the inner shaft and separated at a side surface from an end surface of the outer ring by a gap, the sealing device comprising:
a slinger fitted and fixed to the end portion of the inner shaft and extending in a radially outward direction;
a single-piece core metal fitted and fixed to an end portion of the outer ring;
a single-piece seal body that includes a first seal annular portion, a first seal cylindrical portion, a second seal cylindrical portion, and a second seal annular portion;
an inner seal lip integrally formed at the second seal annular portion; and
an outer seal lip integrally formed at the first seal annular portion;
wherein:
the first seal cylindrical portion, the first seal annular portion, and the second seal cylindrical portion together surround the end portion of the outer ring,
the seal body is fixed to the core metal,
the first seal annular portion extends in a radially inward direction from the first seal cylindrical portion,
the second seal cylindrical portion extends in an axially inward direction from an inner peripheral end portion of the first seal annular portion,
the second seal annular portion extends in the radially inward direction from the second seal cylindrical portion,
the inner seal lip is in slidable contact with an axially inwardly facing side surface of an annular portion of the slinger, the annular portion of the slinger extending in the radially outward direction,
the outer seal lip is disposed radially outward of the inner seal lip and is in slidable contact with the side surface of the flange portion,
a surface of the seal body with a diameter that widens from an axially inner side toward an axially outer side connects an inner peripheral end portion of a side surface at an axially outer side of the first seal annular portion to an axially outer end portion of an inner peripheral surface of the second seal cylindrical portion,
the surface of the seal body with the diameter that widens is disposed to intersect a virtual extension line extending radially outward along an entirety of a side surface at an axially outer side of the annular portion of the slinger, and
the surface of the seal body with the diameter that widens radially overlaps an axial outermost side surface of the annular portion of the slinger through a gap, wherein the diameter widens by curving outward between the first seal annular portion and the second seal cylindrical portion.

2. The sealing device according to claim 1, wherein the slinger includes:
a cylindrical portion fitted and fixed to the end portion of the inner shaft; and
the annular portion extending in the radially outward direction from an end portion of the cylindrical portion and disposed to be spaced apart from the side surface of the flange portion in an axial direction with a predetermined space provided therebetween.

3. The sealing device according to claim 1 further comprising:
a labyrinth lip fixed to the core metal radially outward of the outer seal lip,
wherein the labyrinth lip forms a labyrinth seal with the side surface of the flange portion.

* * * * *